US008701908B2

(12) United States Patent
Bond et al.

(10) Patent No.: US 8,701,908 B2
(45) Date of Patent: Apr. 22, 2014

(54) CAP WITH COUNTER

(76) Inventors: Gregg Bond, Beverly Hills, CA (US); Steven Wagner, Agoura Hills, CA (US); Kenneth A. Tarlow, Corte Madera, CA (US)

( * ) Notice: Subject to any disclaimer, the term of this patent is extended or adjusted under 35 U.S.C. 154(b) by 0 days.

(21) Appl. No.: 12/932,706

(22) Filed: Mar. 4, 2011

(65) Prior Publication Data

US 2012/0223091 A1 Sep. 6, 2012

(51) Int. Cl.
*B65D 85/00* (2006.01)
*A61J 1/00* (2006.01)
*G01D 13/08* (2006.01)

(52) U.S. Cl.
USPC ............... 215/230; 215/365; 215/366; 221/7; 116/284; 116/285; 116/299

(58) Field of Classification Search
USPC ............... 215/230, 365, 366; 221/7; 116/284, 116/285, 299
See application file for complete search history.

(56) References Cited

U.S. PATENT DOCUMENTS

| | | | | |
|---|---|---|---|---|
| 7,568,481 | B2 * | 8/2009 | Scarrott et al. | 128/205.23 |
| 7,857,134 | B2 * | 12/2010 | Koch | 206/534 |
| 8,082,873 | B2 * | 12/2011 | Nuttall | 116/285 |
| 2009/0283538 | A1 * | 11/2009 | Collins et al. | 221/1 |

* cited by examiner

*Primary Examiner* — Anthony Stashick
*Assistant Examiner* — Madison L Poos
(74) *Attorney, Agent, or Firm* — Blakely Sokoloff Taylor & Zafman

(57) ABSTRACT

Cap with a hollow housing containing a count down mechanism so that when a person pushes down on the cap during the opening process, a rotational force within the housing causes the day and numerical count indices printed on cylinders within the housing to advance one station so that the day and count indices showing in viewing apertures located on the outside wall of the housing reflect the fact that an item such as a pill has been taken by the user. A preferred embodiment includes a ring release slide mechanism that allows the user to disengage the advancing mechanism so that the user can manually rotate the counting mechanism to initially set the indices to the correct location with respect to the viewing apertures and to be able to reset the indices if the user presses on the top cap housing accidentally.

4 Claims, 5 Drawing Sheets

CAP WITH COUNTER

CROSS REFERENCE TO RELATED APPLICATIONS

Not Applicable

STATEMENT REGARDING FEDERALLY SPONSORED RESEARCH OR DEVELOPMENT

Not Applicable

DESCRIPTION OF ATTACHED APPENDIX

Not Applicable

BACKGROUND OF THE INVENTION

This invention relates generally to the field of mechanical counting devices and more specifically to a cap with counter. Many pharmaceuticals are commonly sold in pill form. Pills are portion sized single dose delivery systems for a wide variety of prescribed and over the counter medications. Most of the time, pills are sold in pill bottles which have tamper proof lids or caps. The caps generally require a downward pressure before applying a clockwise twisting action to open. The downward pressure disengages the tamper proof feature. Even over the counter pharmaceuticals such as vitamin pills incorporate this type of tamper proof feature and require downward pressure before opening. Usually instructions-regarding dosage and frequency of pill taking are printed on the side of the bottle, either by the manufacturer or by the pharmacy that is selling the pills. It is important for users of these pills to keep track of whether they took their medication on a given day. To this end, there are a number of pill containers on the market that include electronic timing devices that remind people when to take their medication.
These include a vibrating watch with pill taking alarm built in, a pill vial cap that fits directly onto a pill bottle and electronically beeps when a pill taking time has arrived, and many box shapes that have timers built into them.

However there are several deficiencies in the prior technology. First, only the most sophisticated and expensive of the pill timers tells a user how many pills he or she has taken on a particular day. Second, the existing units tend to be hard to program, especially for older individuals who have had little experience with programming electronic devices. Additionally, there is a danger that the battery in an electronic pill timer device will go dead, thereby voiding any possible benefits of such a device. Finally, and most importantly, all the devices listed above are relatively expensive to purchase, especially the ones that are sophisticated enough to tell the user how many pills remain and how many pills were taken on a particular day.

BRIEF SUMMARY OF THE INVENTION

The primary object of the invention is to provide a cap that includes an inexpensive mechanism that counts the number of pills left in a pill bottle after each use.

Another object of the invention is to provide a pill cap with count down mechanism that also indicates the day of use.

Another object of the invention is to provide a pill cap that can be adjusted to account for multiple uses per day.

A further object of the invention is to provide a cap with count down mechanism that can adapt to fit on top of an existing pill cap.

Yet another object of the invention is to provide a pill cap with count down mechanism that is inexpensive to manufacture.

Still yet another object of the invention is to provide a cap with count down mechanism where the user can adjust the count down mechanism as needed.

Other objects and advantages of the present invention will become apparent from the following descriptions, taken in connection with the accompanying drawings, wherein, by way of illustration and example, an embodiment of the present invention is disclosed.

In accordance with a preferred embodiment of the invention, there is disclosed a cap with counter comprising: a top main cover, a main housing body, a twist post, a twist post compression spring, a ratchet housing top, a ratchet housing bottom, a ratchet wheel, a one way washer, a ratchet pawl, a first drive gear, a second drive gear, a counting ring gear, a pill count down ring and a day count down ring. Said ratchet wheel, said one way washer, said first drive gear and said ratchet pawl are contained within said ratchet housing that is itself contained within said top main cover and said main housing body. Said twist post is fixedly connected at one end to the underside of said main cover and surrounded by said twist post spring and then penetrating said ratchet housing and engaging said one way washer. The top surface of said ratchet wheel includes a plurality of radially spaced sloping raised ribs that engage said one way washer. Said first drive gear is fixedly and centrally attached to the underside of said ratchet wheel. Said first drive gear engages said counting ring gear. Said counting gear is fixedly attached to the perimeter of the inner wall of said day count ring. Said day count ring including indices representing days of the week that are affixed to the outer surface of said day count ring. Said pill count down ring being similar in diameter to said day count ring and including numerical indices affixed to the outer surface. of said pill count down ring and is stacked upon and releasably attached to said day count ring, Wherein said count down rings are situated slidably and rotatably within said main body housing. Said main body housing including an aperture for viewing day indices located on said day count ring and an aperture for viewing a pill count indices located on said pill count down ring. When a person pushes down on said top main cover in the course of opening a standard pill bottle, said pushing action causes said spring based twist post to rotate in a clockwise direction thereby causing said one way washer to rotate in a clockwise direction which in turn causes said ratchet wheel and said attached first drive gear to rotate in a clockwise direction, thereby causing said second drive gear to rotate in a counter dockwise direction, thereby causing said counting ring gear and said attached day count ring to rotate in a counter clockwise direction thereby causing said day indices and said pill count indices to advance one station so that the said day and pill count indices showing in said viewing apertures reflect the fact that a pill has been taken by said user on a specific day and that one less pill remains in said pill bottle.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
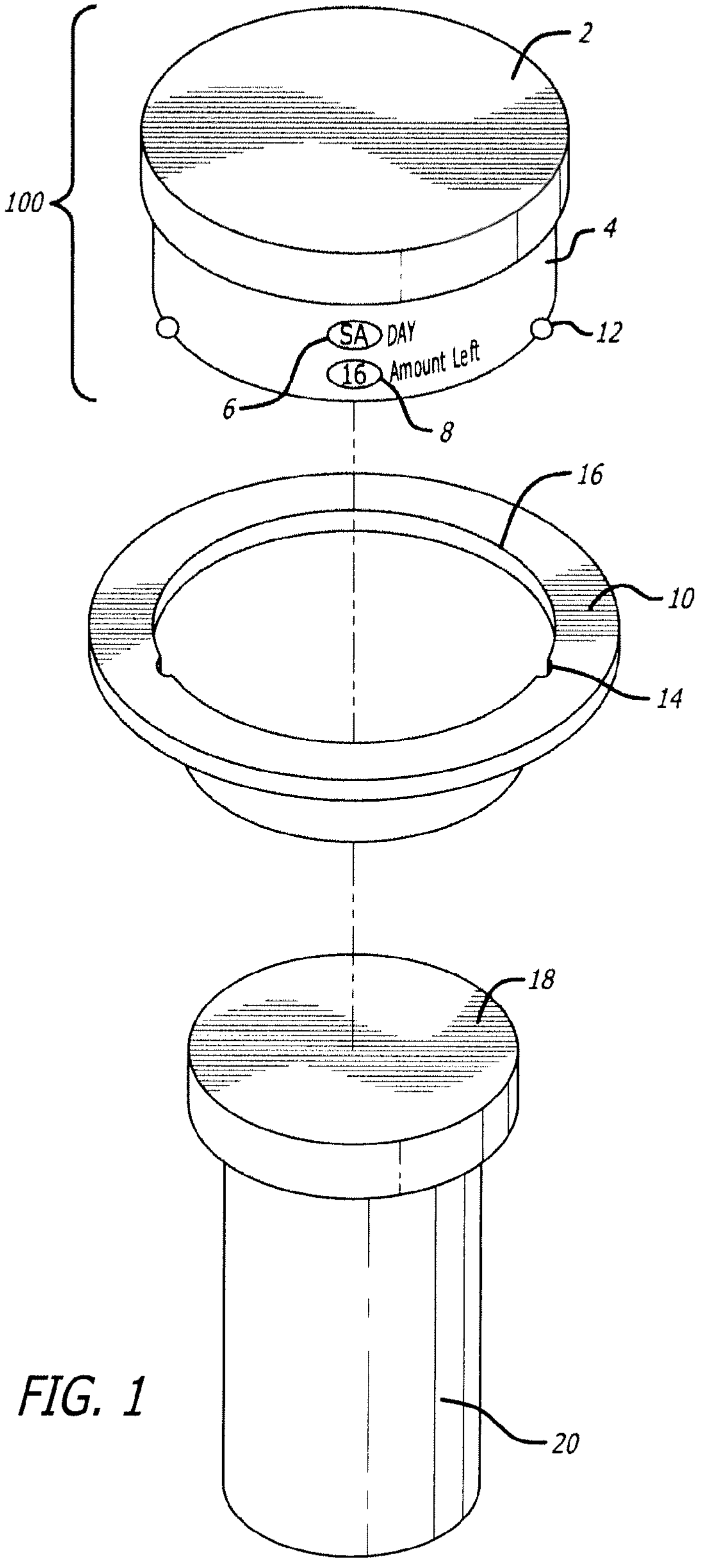
FIG. 1 is an exploded perspective view of the invention showing its attachment to a standard pill bottle.
Figure 2:
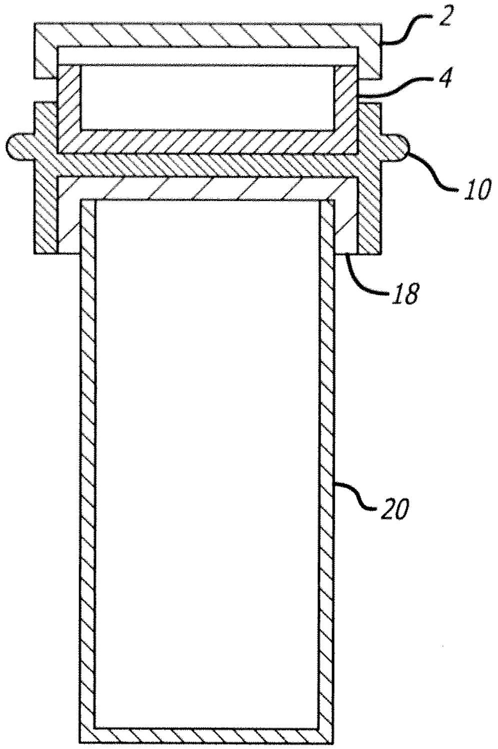
FIG. 2 is a side section view of the invention as it is attached to a standard pill bottle.

Referring now to FIG. 1 we see an exploded perspective view of the counting cap device 100 along with a adaptor ring 10 and a standard pill cap 18 and pill bottle 20. The pill counting device 100 frictionally fits into recess 16 and is prevented from turning by tabs 12 and tab retaining depressions 14. The adaptor ring 10 presses onto pill cap 18. The ridges normally found around the perimeter of pill cap 18 mate with a similarly shaped female depression on the underside of adaptor ring 10 to prevent the ring 10 from turning with respect to pill cap 18. A clear image of this configuration can be seen in FIG. 2. The section view shown is defined by section line 80 shown in FIG. 5 top view. The count down mechanism normally housed within cap cover 2 and main housing body 4 is not shown in this view for clarity purposes.

Figure 3:
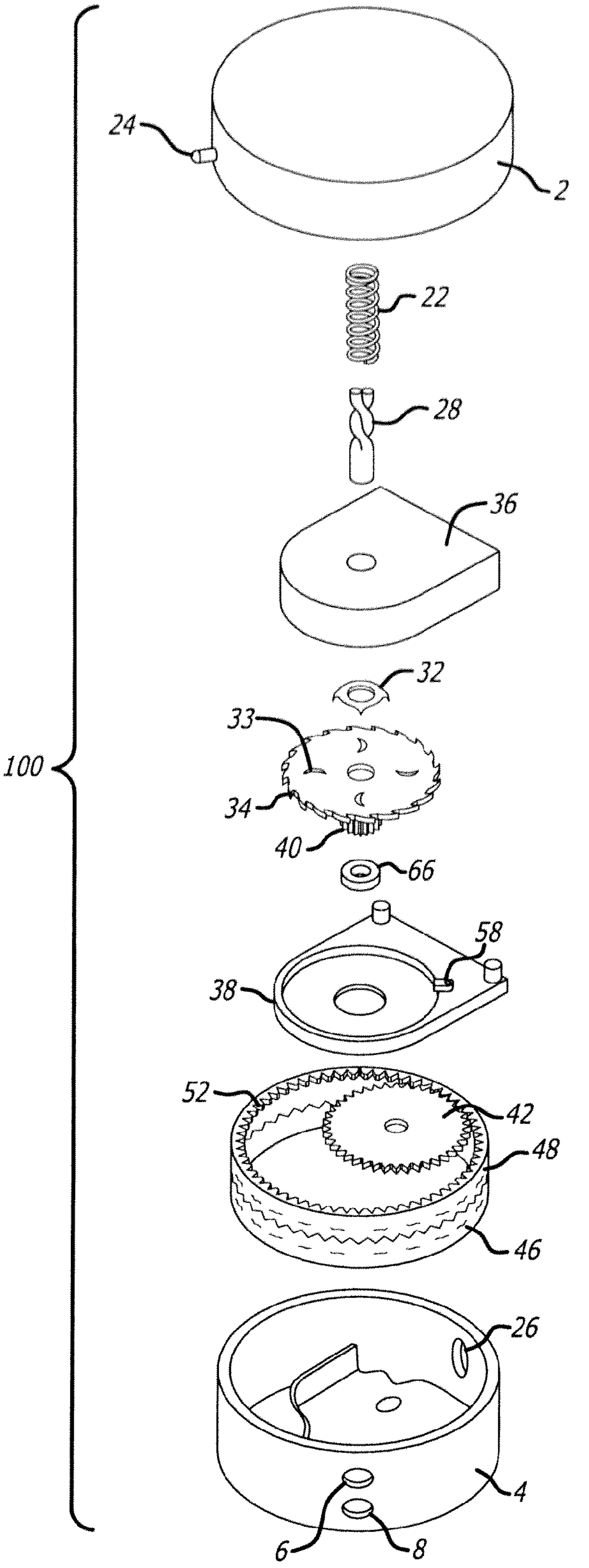
FIG. 3 is an exploded view of the cap of the invention.

FIG. 3 shows an exploded perspective view of the cap count down mechanism of the present invention 100. Top cover 2, along with main housing 4 encloses the rest of the pill counting mechanism. Tabs 24 on the outer perimeter of top cover 2 engage slots 26 located on the side walls of main housing 4 thereby keeping the two slidably engaged. Twist post 28 is fixedly attached to the underside of cap 2. Compression spring 22 provides a return force after the cover 2 has been pressed by the user. Twist post 28 penetrates ratchet housing top 36 and engages one way washer 32. Twist post retaining cap 66 prevents the twist post 28 from exiting the count down assembly. A downward pressing action against the top of cap 2 causes twist post 28 to rotate the one way washer 32. The washer 32, in turn engages raised ramp members 33 and thereby rotates ratchet wheel 34. When the twist post 28 is pulled up by spring 22, the one way washer lifts over the ramps of ramp members 34 thereby allowing the ratchet wheel 34 to turn in a clockwise direction when twist post 28 is pushed down, but remains unmoving when twist post 28 is lifted up. Additionally, pawl 58 engages the teeth of ratchet wheel 34 allowing ratchet wheel to rotate during the push down activity, but to remain stationary during the return upward activity of twist post 28.

A first drive gear 40 is fixedly and centrally attached to the underside of ratchet wheel 34. First drive gear 40 engages second drive gear 42 which in turn engages counting ring gear 52. Ring gear 52 is fixedly attached to the inner surface diameter of day count down ring 48. So, when a user presses down on top cover 2 a mechanical transmission of forces as described above causes the day count ring 48 to advance one station. Indices printed on the outside perimeter of ring 48 show days of the week in sequential order. Each time top cover 2 is pressed, the day indicia changes. If a pill is meant to be taken once a day, the day indices would count "Sa, Su, Mo, Tu, We, Th, Fr, Sa," and so forth. If a pill were meant to be taken three times a day, the day indices would count "Sa-1, Sa-2, Sa-3, Su-1, Su-2, Su-3, Mo-1, Mo-2, Mo-3" and so forth. Count down ring 46 is frictionally attached to the day count ring 48 via a wavy interface so that as day count ring 48 turns, pill count down ring 46 automatically turns with it. So as the day count ring advances in days, the count down ring counts down, for example "30, 29, 28, 27, 26" and so forth. Since opening a standard pill bottle requires the user to push down on the cap to disengage the child proof feature, the user will automatically cause the counting rings 46, 48 to advance each time a pill is taken. Apertures 6, 8 on the perimeter of housing 4 allow the user to see the day and pill count as they advance.

Figure 4:
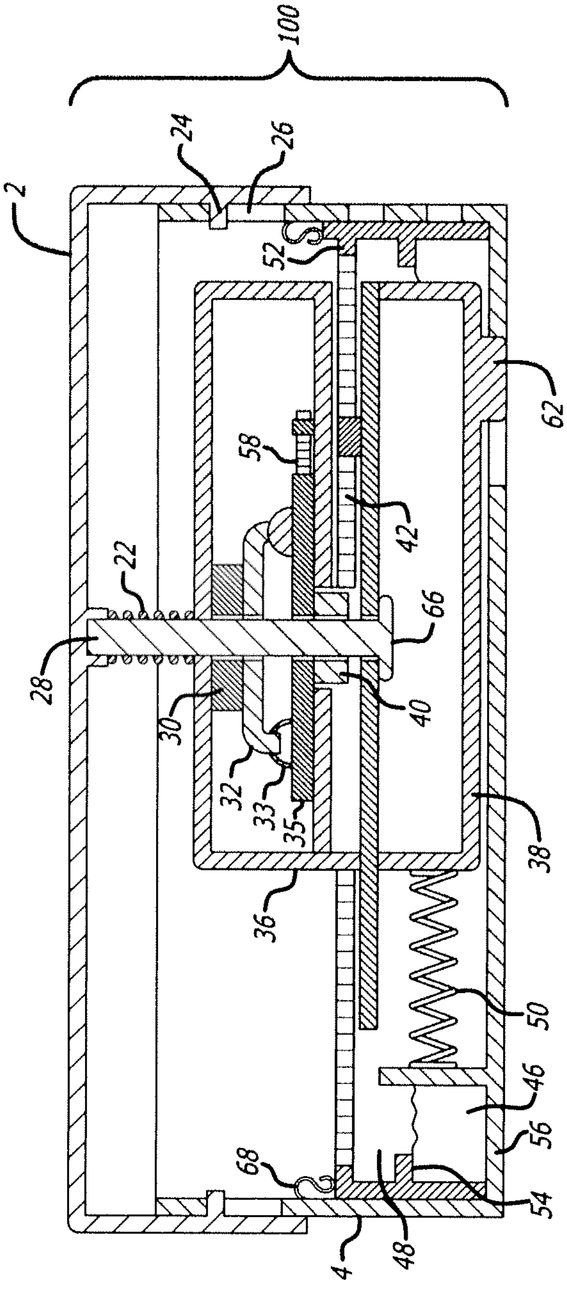
FIG. 4 is a side section view of the cap of the invention.

FIG. 4 shows a side section view of the cap count down mechanism of the present invention 100. This view clearly shows the relationship of the mechanical components within the pill count housing 2, 4. Foam compression washer 30 automatically pushes one way washer 32 down after it has ridden over raised ramps 33. The user can set the count rings 46, 48 by inserting a pointed object such as a pencil point or a ball point pen tip into aperture 56 and engaging depressions 54 located on the bottom edge of count rings 46, 48 and forcing the rings in a clockwise or counter clockwise direction until the correct indices appear in housing apertures 6, 8. The leaf springs 68 mounted to the inside wall of housing 4 and press down on the top edge of count ring 48. Due to the wavy design of the interface between the two rings 46, 48. the user can hold one count ring in place while forcing the other ring to rotate thereby adjusting the two rings independently.

FIG. 4 also shows that the ratchet housing 36, 38 is independent of outer housing 2, 4 and can slide back when a user pulls on ring gear release slide button 62. When the second drive gear 42 is disengaged from counting ring gear 52, the user can easily adjust the rings 46, 48 clockwise or counter clockwise as described above. Compression spring 50 automatically pushes second drive gear 42 into ring gear 52 during normal use.

Figure 5:
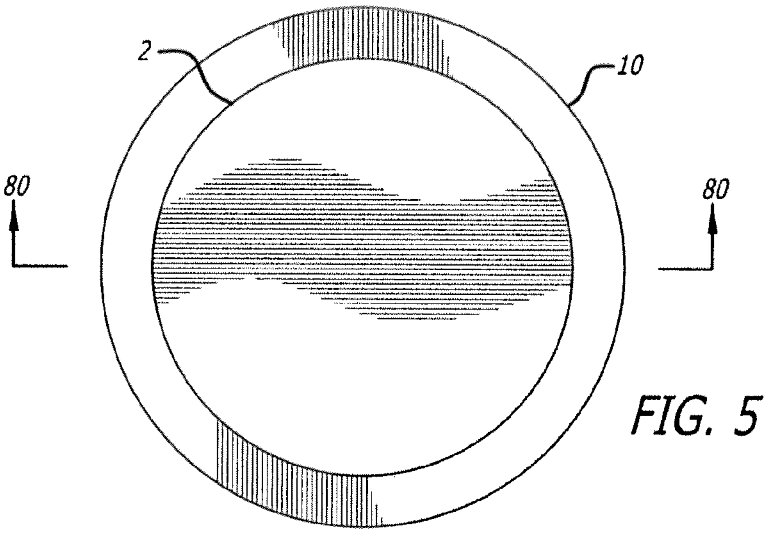
FIG. 5 is a top view of the invention.
Figure 6:
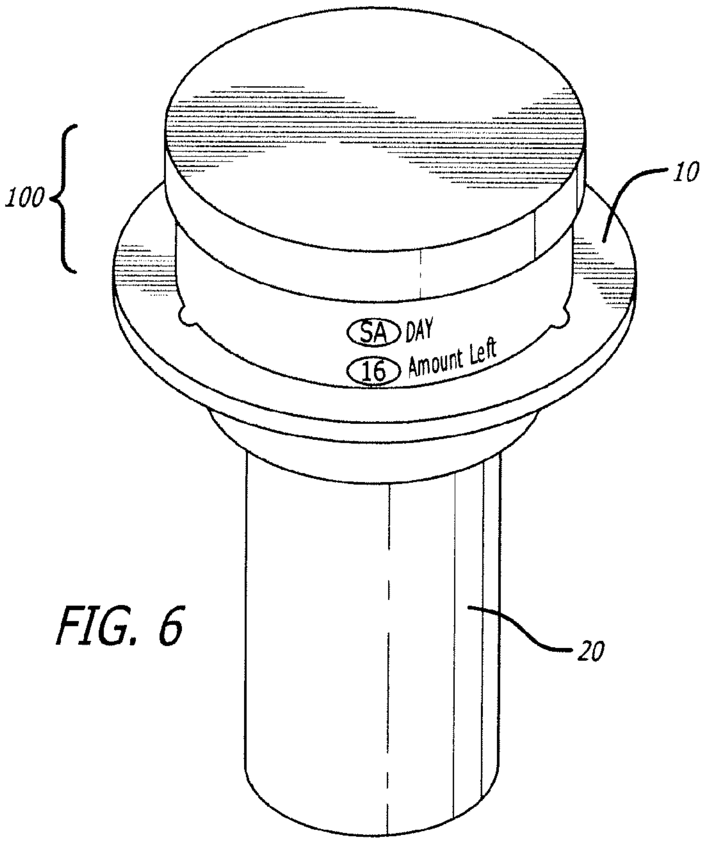
FIG. 6 is a perspective view of the invention mounted on a standard pill bottle

FIG. 5 is a top section view of the invention. FIG. 6 is a perspective view of the invention 100 in place on adaptor ring 10 which is in place on a standard pill cap, not shown, and pill bottle 20. A plurality of adaptor rings can be made available to accommodate pill bottles or various pharmaceutical bottles that have different diameter caps, but use the same push down principle to override the child safety feature.

Obviously, the present invention can be incorporated directly into the design of a a primary pill cap without the need for a secondary cap or adaptor ring. Additionally, the present invention can be used as a cap for other food items besides pills, such as candy, fish food, or even non food items such as beads or coins.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. Cap with counter comprising;

a cylindrical top main cover having a flat top and attached side wall;

a cylindrical main housing body having a flat bottom surface and attached side wall with a transparent viewing window and slidably titling within a perimeter of said top cover;

said top cover restrained from being released from said main housing by a standard slidable means; a compression spring;

a cylindrical ring having indicia affixed to its outer surface and fitting within said main housing body;

a mechanical advancing mechanism;

wherein when a user presses down on said top main cover said cylindrical ring is advanced a specific and repeatable distance by said mechanical advancing mechanism causing the indicia on said ring to advance and be viewed through said transparent viewing window and said top cover returns to its original position by means of said compression spring and retained by said standard means.

2. Cap with counter as claimed in claim 1 wherein said mechanical advancing mechanism includes;

a twist post;

said compression spring now called a twist post compression spring;

a ratchet housing top;

a ratchet housing bottom;

a ratchet wheel;

a one way washer;

a ratchet pawl;

a first drive gear;

a second drive gear a counting ring gear, a pill count down ring;

a day count down ring; and wherein said ratchet wheel, said one way washer, said first drive gear and said ratchet pawl are contained within said ratchet housing that is itself contained within said top main cover and said main housing body;

and wherein said twist post is fixedly connected at one end to an underside of said main cover and surrounded by said twist post spring and then penetrates said ratchet housing and engages said one way washer;

and wherein a top surface of said ratchet wheel includes a plurality of radially spaced sloping raised ribs that engage said one way washer;

and wherein said first drive gear is fixedly and centrally attached to an underside of said ratchet wheel;

and wherein said first drive gear engages said counting ring gear;

and wherein said counting gear is fixedly attached to a perimeter of an inner wall of said day count down ring;

said day count down ring including indices representing days of the week affixed to an outer surface of said day count down ring;

and wherein the said pill count down ring similar in diameter to said day count down ring and includes numerical indices affixed to an outer surface of said pill count down ring and is stacked upon and releasably attached to said day count down ring;

wherein said count down rings are situated slidably within said main body housing;

wherein said main body housing includes an aperture for viewing a day indices located on said day count down ring and an aperture for viewing a pill count indices located on said pill count down ring;

so that when a person pushes down on said top main cove course of opening a standard pill bottle, said pushing action causes said spring biased twist post to rotate in a clockwise direction thereby causing said one way washer to rotate in a clockwise direction which in turn causes said ratchet wheel and said attached first drive gear to rotate in a clockwise direction, thereby causing said second drive gear to rotate in a counter clockwise direction, thereby causing said counting ring gear and said attached day count down ring to rotate in a counter clockwise direction thereby causing said day indices and said pill count indices to advance one station so that the said day and pill count indices showing in said viewing apertures reflect the fact that a pill has been taken by said user on a specific day and that one fewer pill remains in said pill bottle.

3. Cap with counter as claimed in claim 2 further comprising a ring release slide mechanism that allows the said user to disengage said second drive gear from said counting ring gear so that said user can manually rotate said ring gear to initially set the said indices to a correct location with respect to said viewing apertures and to be able to reset said indices if the user accidentally pressed on said top cap housing.

4. Cap with counter as claimed in claim 1 further comprising a plurality of adaptor rings that allows the user to attach said pill counting pill cap to a plurality of existing standard pill caps.

* * * * *